United States Patent
Fujimoto et al.

(10) Patent No.: US 7,428,139 B2
(45) Date of Patent: *Sep. 23, 2008

(54) SOLID ELECTROLYTIC CAPACITOR

(75) Inventors: Kazumasa Fujimoto, Saga (JP); Satoru Yoshimitsu, Saga (JP); Yasushi Yoshida, Fussa (JP); Hiromu Saito, Hamura (JP)

(73) Assignees: Sanyo Electric Co., Ltd., Moriguchi-shi (JP); Saga Sanyo Industries Co., Ltd., Kishima-gun (JP); Japan Capacitor Industrial Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/598,712

(22) Filed: Nov. 14, 2006

(65) Prior Publication Data

US 2007/0115613 A1  May 24, 2007

Related U.S. Application Data

(63) Continuation of application No. 10/534,283, filed as application No. PCT/JP03/14603 on Nov. 17, 2003, now Pat. No. 7,158,367.

(30) Foreign Application Priority Data

Nov. 19, 2002 (JP) ............................. 2002-334662
Mar. 13, 2003 (JP) ............................. 2003-67501

(51) Int. Cl.
*H01G 9/00* (2006.01)
*H01G 9/04* (2006.01)

(52) U.S. Cl. ...................................... 361/532; 361/528
(58) Field of Classification Search ................. 361/523, 361/526–530, 532–533
See application file for complete search history.

(56) References Cited

U.S. PATENT DOCUMENTS

| 6,052,273 | A | 4/2000 | Inoue et al. ................. 361/523 |
| 6,515,847 | B1 | 2/2003 | Naraya ....................... 361/523 |
| 7,158,367 | B2 * | 1/2007 | Fujimoto et al. ............ 361/532 |

FOREIGN PATENT DOCUMENTS

| EP | 0 905 274 A1 | 3/1999 |
| JP | HEI.2-280310 | 11/1990 |
| JP | 4-71214 | 3/1992 |
| JP | 5-74664 | 3/1993 |

(Continued)

OTHER PUBLICATIONS

International Search Report dated Mar. 2, 2004.

(Continued)

*Primary Examiner*—Eric Thomas
(74) *Attorney, Agent, or Firm*—Kratz, Quintos & Hanson, LLP

(57) ABSTRACT

A solid electrolytic capacitor (1) comprises a capacitor element (2) which includes an anode foil (4) and a cathode foil (5) rolled with a separator (6) interposed therebetween, and a solid electrolyte layer or an electrically conductive polymer layer provided therein. The cathode foil (5) is coated with a film of a titanium-containing composite metals nitride. The composite metals nitride is aluminum titanium nitride, chromium titanium nitride, or zirconium titanium nitride.

4 Claims, 2 Drawing Sheets

FOREIGN PATENT DOCUMENTS

| | | |
|---|---|---|
| JP | 06-005476 | 1/1994 |
| JP | 2000-12400 A | 1/2000 |
| JP | 2000-114108 | 4/2000 |
| JP | 2000-509101 | 7/2000 |
| JP | 2002-299181 | 10/2002 |
| WO | WO 00/19468 | 4/2000 |

OTHER PUBLICATIONS

Japanese Office Action dated Nov. 27, 2007 with English translation.

* cited by examiner

SOLID ELECTROLYTIC CAPACITOR

CROSS REFERENCE TO RELATED APPLICATION

This application is Continuation of prior application Ser. No. 10/534,283 filed May 9, 2005 (now U.S. Pat. No. 7,158,367 issued Jan. 2, 2007), which is a 37 C.F.R. §371 application of PCT/JP03/14603 filed on Nov. 17, 2003.

TECHNICAL FIELD

The present invention relates to a solid electrolytic capacitor which is produced by rolling an anode foil and a cathode foil.

BACKGROUND ART

FIG. 2 is a sectional front view of a prior art solid electrolytic capacitor 1, and FIG. 1 is a perspective view of a capacitor element 2 (see Japanese Examined Patent Publication No. HEI 4-19695 (1992)).

The solid electrolytic capacitor 1 includes an aluminum case 3 having a top opening, the capacitor element 2 contained in the case 3, and a rubber packing 30 which seals the top opening of the case 3. An upper edge portion of the case 3 is curved to fix the packing 30, and a plastic seat plate 31 is attached to the top of the case 3. Lead wires 21, 21 extend from the capacitor element 2 through the packing 30 and the seat plate 31, and then bent laterally.

As shown in FIG. 1, the capacitor element 2 includes an anode foil 4 of an aluminum foil coated with a dielectric oxide film and a cathode foil 5 of an aluminum foil, which are rolled together into a roll with a separator 6 of a dielectric material such as paper interposed therebetween and fixed by a tape 26. The capacitor element 2 further includes a solid electrolyte such as a TCNQ (7,7,8,8-tetracyanoquinodimethane) complex salt impregnated therein, or an electrically conductive polymer layer provided therein. Lead tabs 25, 25 respectively extend from the anode foil 4 and the cathode foil 5, and the lead wires 21, 21 respectively extend from the lead tabs 25, 25.

Where the electrically conductive polymer layer is formed between the foils 4 and 5, the capacitor element 2 is impregnated with a solution mixture containing n-butyl alcohol as a diluent, 3,4-ethylenedioxythiophene and iron p-toluenesulfonate, followed by thermal polymerization.

Although the solid electrolytic capacitor 1 having such a construction is widely used, there is a market demand for a capacitor having a smaller size and a greater capacitance. To this end, there has been proposed a capacitor which includes a cathode foil 5 coated with a metal nitride film as will be described below (see Japanese Unexamined Patent Publication No. 2000-114108).

An explanation will be given to the principle of the capacitance increase of the capacitor by coating the cathode foil 5 with the metal nitride film. In general, the dielectric oxide film is not intentionally formed on the cathode foil 5, but formed by natural oxidation. Therefore, the capacitance C of the capacitor is equivalent to a capacitance obtained by connecting the capacitance Ca of the anode foil 4 and the capacitance Cc of the cathode foil 5 in series, and represented by the following equation:

C=Ca×Cc/(Ca+Cc)=Ca×1/(Ca/Cc+1)

That is, if the cathode foil 5 has the capacitance Cc, the capacitance C of the capacitor is smaller than the capacitance Ca of the anode foil 4.

Where a film 52 of a metal nitride such as TiN is formed on the cathode foil 5 by sputtering or vapor deposition, however, molecules of the metal nitride supposedly intrude into the oxide film 51 to contact an aluminum base of the cathode foil 5. Therefore, the base and the metal nitride are electrically connected to each other, so that the cathode foil 5 has no capacitance. Thus, the capacitance of the capacitor can be increased without size increase of the capacitor.

However, this arrangement has the following drawbacks.

When the cathode foil 5 coated with the metal nitride film 52 is rolled for production of the capacitor element 2, the film 52 is liable to be exfoliated or cracked due to a tensile force or a twist force applied to the cathode foil 5. As a result, a leak current is increased. Further, where the electrically conductive polymer layer is formed between the foils 4 and 5 by impregnating the capacitor element 2 with the solution mixture containing 3,4-ethylenedioxythiophene and iron p-toluenesulfonate, the film 52 is liable to be eroded because the iron p-toluenesulfonate solution is highly acidic. This also results in the increase in the leak current.

The cathode foil 5 coated with the metal nitride film 52 are gradually oxidized over time. As a result, the cathode foil 5 has a capacitance, whereby the capacitance of the solid electrolytic capacitor 1 is liable to be reduced.

It is therefore an object of the present invention to provide a solid electrolytic capacitor substantially free from the increase in leak current and having a greater capacitance and a lower ESR (equivalent series resistance).

DISCLOSURE OF THE INVENTION

An inventive solid electrolytic capacitor 1 comprises a capacitor element 2 which includes an anode foil 4 and a cathode foil 5 rolled with a separator 6 interposed therebetween, and a solid electrolyte layer or an electrically conductive polymer layer provided therein. The cathode foil 5 is coated with a film of a titanium-containing composite metals nitride.

Alternatively, the cathode foil 5 is coated with a film comprising a titanium nitride layer. The film further comprises a titanium layer underlying the titanium nitride layer on the cathode foil 5.

BEST MODE FOR CARRYING OUT THE INVENTION

First Embodiment

One embodiment of the present invention will hereinafter be described in detail with reference to the attached drawings.

Figure 1:
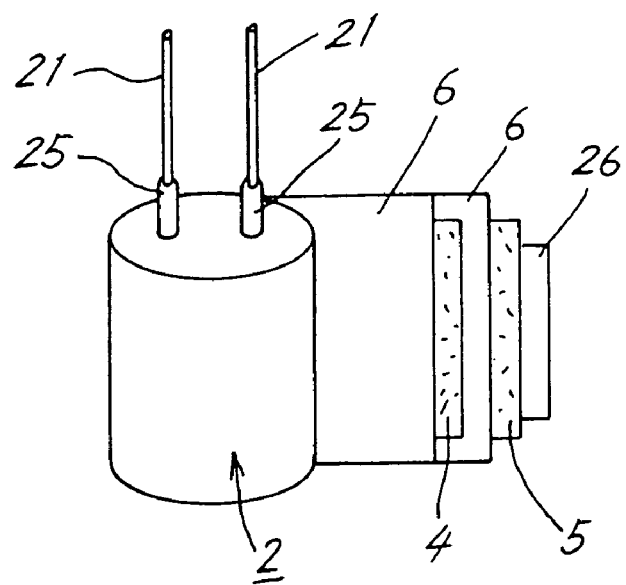
FIG. 1 is a perspective view of a prior art capacitor element.
Figure 2:
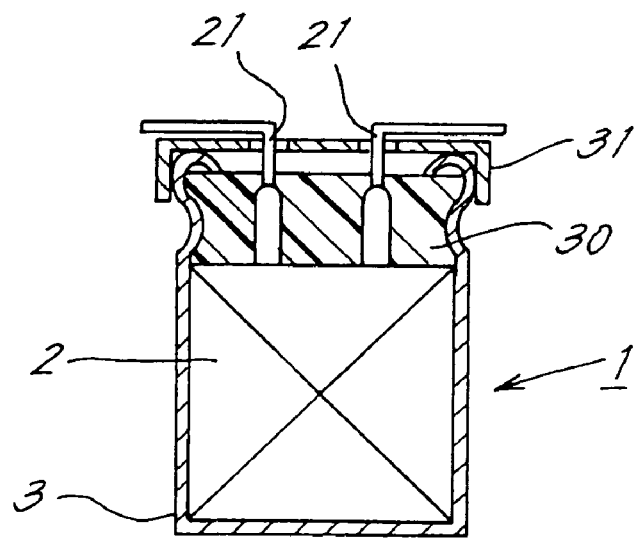
FIG. 2 is a sectional front view of a prior art solid electrolytic capacitor.

The solid electrolytic capacitor 1 has substantially the same overall construction as the prior art capacitor shown in FIG. 2. As shown in FIG. 1, a capacitor element 2 includes an anode foil 4 of an aluminum foil having an electrochemically formed film and a cathode foil 5 of an aluminum foil, which are rolled together into a roll with an insulative separator 6 interposed therebetween and fixed by a tape 26. The capacitor element 2 further includes a solid electrolyte such as a TCNQ complex salt impregnated therein, or an electrically conductive polymer layer provided therein. A pair of lead wires 21, 21 extend from the capacitor element 2.

A film including a titanium (Ti) thin layer and a titanium nitride thin layer is provided on the cathode foil 5 and, hence, has no capacitance as described above.

The capacitor element 2 is produced in the following manner. First, an aluminum foil strip cut out of an aluminum sheet is subjected to an etching process and an electrochemical process thereby to be formed with a dielectric oxide film 40 (see FIG. 3). Thus, the anode foil 4 is produced. The etching process roughens surfaces of the anode foil 4 to increase the surface area of the anode foil 4, thereby increasing the capacitance of the anode foil 4.

On the other hand, titanium layers are formed on surfaces of the cathode foil 5 by vapor deposition of titanium in vacuum, and titanium nitride layers are formed on the titanium layers by vapor deposition of titanium nitride in vacuum. The vapor deposition of titanium nitride is achieved by evaporating titanium in a nitrogen or ammonia atmosphere. After the formation of the titanium layers, nitrogen or the like is introduced into a vacuum chamber for prevention of formation of an oxide film while titanium is evaporated. Thus, the formation of the titanium nitride layers is achieved. Electron beam evaporation, arc plasma evaporation or the like may be employed for the formation of the titanium layers and the titanium nitride layers. Instead of the vapordeposition, sputtering or CVD may be employed for the film formation.

Then, the anode foil 4 and the cathode foil 5 are rolled together into a roll with an insulative separator 6 interposed therebetween, and fixed by a tape 26. Since the anode foil 4 is prepared by cutting the foil strip from the aluminum sheet as described above, end faces of the anode foil 4 are not formed with the dielectric oxide film. Therefore, the capacitor element 2 is subjected to an electrochemical process to form dielectric oxide films on the end faces of the anode foil 4. Thereafter, the capacitor element 2 is thermally treated at 280° C. for stabilization of the characteristics of the dielectric oxide films.

In turn, the capacitor element 2 is impregnated with a solution mixture containing n-butyl alcohol as a diluent, 3,4-ethylenedioxythiophene and iron p-toluenesulfonate, followed by thermal polymerization. Thus, an electrically conductive polymer layer 50 is formed between the foils 4 and 5, whereby the capacitor element 2 is completed. The capacitor element 2 is sealed in the case 3 in the same manner as in the prior art, whereby the solid electrolytic capacitor 1 is completed.

In this embodiment, the electrically conductive polymer layer 50 is formed of an electrically conductive polythiophene polymer, but may be formed of an electrically conductive polypyrrole or polyaniline polymer. Instead of the electrically conductive polymer layer, a solid electrolyte layer such as of a TCNQ complex salt may be formed.

Figure 3:
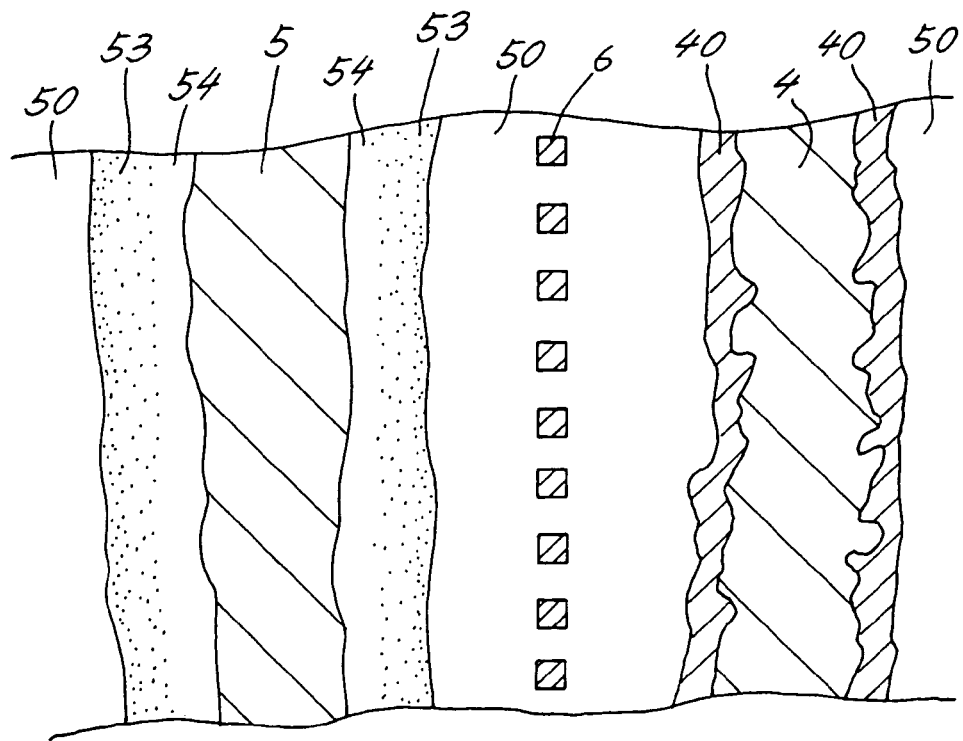
FIG. 3 is a schematic sectional view illustrating a part of a capacitor element.
Figure 4:
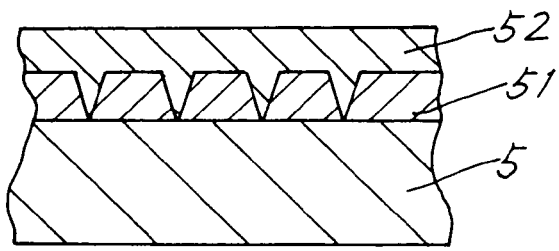
FIG. 4 is a sectional view for explaining how a metal nitride film intrudes into an oxide film to reach a base.

FIG. 3 is a sectional view illustrating a part of the capacitor element 2 obtained after the impregnation process. The cathode foil 5 has the titanium layers formed by vapor deposition of titanium in vacuum, and the titanium nitride layers formed by vapor deposition of titanium nitride in vacuum. Analysis of a section of the cathode foil 5 reveals, as shown in FIG. 3, that the thin films formed on the cathode foil 5 each continuously vary from the titanium nitride layer 53 to the titanium layer 54 toward the cathode foil 5 and no definite interface is present between the titanium nitride layer 53 and the titanium layer 54. This is supposedly because nitrogen of titanium nitride deposited on the titanium layer is diffused into the titanium layer during the vapor deposition of titanium nitride or a subsequent step of the solid electrolytic capacitor production process.

Next, the results of tests performed on solid electrolytic capacitors actually produced according to the present invention and the prior art will be described below.

Table 1 shows electrical characteristics of the produced solid electrolytic capacitors in an initial state (immediately after the production). Prior Art Example 1 is a solid electrolytic capacitor employing an etched aluminum foil as a cathode foil thereof, and Prior Art Example 2 is a solid electrolytic capacitor employing an aluminum foil formed with a titanium thin film as a cathode foil thereof. Prior Art Example 3 is a solid electrolytic capacitor employing an aluminum foil formed with a titanium nitride thin film as a cathode foil thereof. Example is the inventive solid electrolytic capacitor previously described. The solid electrolytic capacitors 1 each have a diameter of 6.3 mm, a height of 6.0 mm, a rated voltage of 4V and a rated capacitance of 150 µF.

In Table 1, Cap" indicates the capacitance of the capacitor (in units of µF), and "tan δ" indicates the dielectric loss of the capacitor (in units of %). "ESR" indicates the equivalent series resistance of the capacitor (in units of mΩ), and "LC" indicates the leak current of the capacitor (in units of µA). Values shown in Table 1 are each calculated as an average of measured values for 40 samples. The capacitance and the dielectric loss were measured at a frequency of 120 Hz. The equivalent series resistance was measured at a frequency of 100 kHz. The leak current was measured after a lapse of 2 minutes from application of a rated DC voltage to the solid electrolytic capacitor 1.

TABLE 1

| | Cathode foil | Cap (µF) | tanδ (%) | ESR (mΩ) | LC (µA) | ΔC/C (%) |
|---|---|---|---|---|---|---|
| Prior Art Example 1 | Al foil treated by etching | 151.4 | 2.8 | 33.7 | 25 | −5.2 |
| Prior Art Example 2 | Al foil with Ti deposited | 219.9 | 2.0 | 33.2 | 19 | −4.2 |
| Prior Art Example 3 | Al foil with TiN deposited | 227.3 | 1.9 | 34.0 | 30 | −3.4 |
| Example | Al foil with Ti and TiN deposited | 253.7 | 1.7 | 34.2 | 20 | −2.1 |

As can be understood from Table 1, the capacitance of Example is greater by about 10% than the capacitances of Prior Art Examples 2 and 3. The dielectric loss of Example is slightly smaller than the dielectric losses of Prior Art Examples. The equivalent series resistance of Example is greater than the equivalent series resistances of Prior Art Examples, but by a very small percentage. The leak current of Example is equivalent to the leak current of Prior Art Example 2 in which the aluminum foil formed with only the titanium thin film was employed, but is much smaller the leak currents of Prior Art Examples 1 and 3. According to the present invention, the initial capacitance of the solid electrolytic capacitor 1 can be thus increased without deterioration of the electrical characteristics including the dielectric loss.

After the measurement shown in Table 1, an endurance test was performed on the capacitors of Prior Art Examples and Example. In the endurance test, a rated voltage of 4V was applied to each of the capacitors at a temperature of 125° C. for 1000 hours. In Table 2, values of the capacitance and the equivalent series resistance measured before and after the test, and the change rate ΔC/C of the capacitance are shown. As in Table 1, the values are each calculated as an average of measured values for 40 samples. As can be understood from Table 2, the inventive solid electrolytic capacitor has a smaller capacitance change rate in absolute value than the prior art solid electrolytic capacitors and, even after the endurance test, had a great capacitance. After the endurance test, the capacitors of Prior Art Examples and Example have substantially the same equivalent series resistance. According to the present invention, the change in the capacitance of the solid electrolytic capacitor 1 over time can be reduced without deterioration of the equivalent series resistance as compared with the prior art.

TABLE 2

|  | Initial | | After test | | |
| --- | --- | --- | --- | --- | --- |
|  | Cap (μF) | ESR (mΩ) | Cap (μF) | ΔC/C (%) | ESR (mΩ) |
| Prior Art Example 1 | 151.4 | 33.7 | 143.5 | −5.2 | 35.6 |
| Prior Art Example 2 | 219.9 | 33.2 | 210.7 | −4.2 | 35.2 |
| Prior Art Example 3 | 227.3 | 34.0 | 219.6 | −3.4 | 35.9 |
| Example | 253.7 | 34.2 | 248.4 | −2.1 | 35.7 |

Second Embodiment

According to this embodiment, an aluminum foil having a film of a titanium-containing composite metals nitride such as aluminum titanium nitride (TiAlN) or chromium titanium nitride (TiCrN) formed on surfaces thereof by an ion plating method is used as a cathode foil 5. The aluminum foil may be preliminarily subjected or not subjected to an etching process. A capacitor element 2 produced by rolling an anode foil 4 and the cathode foil 5 is impregnated with an electrically conductive polymer and an oxidation agent in the same manner as in the first embodiment. An alcohol solution of 40 to 60 wt % iron p-toluenesulfonate is used as the oxidation agent.

The formation of the film is achieved through deposition by the ion plating method. The ion plating may be achieved by a direct current method, a high frequency method, a cluster ion beam deposition method or a hot cathode method. For the formation of the film, vacuum deposition, sputtering, thermal CVD, plasma CVD, photo CVD or laser CVD may be used instead of the ion plating method. The ion plating method supposedly ensures a higher adhesion strength of the film to the aluminum base than the sputtering method.

The applicant of the present invention produced a capacitor element 2 by using a cathode foil 5 formed with a film of aluminum titanium nitride (TiAlN), and then produced a solid electrolytic capacitor 1 of Example 1 by using this capacitor element 2.

Further, the applicant of the present invention produced a capacitor element 2 by using a cathode foil 5 formed with a film of chromium titanium nitride (TiCrN), and then produced a solid electrolytic capacitor 1 of Example 2 by using this capacitor element 2. A solid electrolytic capacitor 1 of Prior Art Example was produced in the same manner as in Prior Art Example 3 of the first embodiment by employing an aluminum foil formed with a titanium nitride thin film as a cathode foil 5.

These solid electrolytic capacitors 1 each have a rated voltage of 6.3V and a capacitance of 180 μF, and the cases thereof each have a diameter of 6.3 mm and a height of 6.0 mm.

The capacitances ("Cap" in units of μF) of the capacitors of Examples and Prior Art Example were measured at a frequency of 120 Hz, and the equivalent series resistances ("ESR" in units of mΩ) of the capacitors were measured at a frequency of 100 kHz. The leak currents ("LC" in units of μA) of the capacitors were measured after a rated direct current voltage was applied for two minutes. The results of the measurement are shown in Table 3, in which the values of the electrical characteristics are each calculated as an average of measured values for 20 samples.

TABLE 3

|  | Cap (μF) | ESR (mΩ) | LC (μA) | Scratch test critical load (N) |
| --- | --- | --- | --- | --- |
| Prior Art Example | 185 | 11.8 | 27 | 60.3 |
| Example 1 | 220 | 10.7 | 0.7 | 80.3 |
| Example 2 | 221 | 10.6 | 0.8 | 82.5 |

Figure 5:
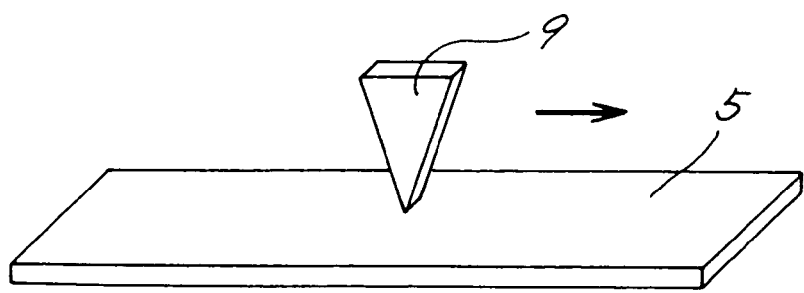
FIG. 5 is a perspective view illustrating a scratch test.

In the scratch test, as shown in FIG. 5, a wedge-like diamond blade 9 was dragged at a constant speed (about 2 mm/sec) while being pressed against the cathode foil 5 with loads applied to the diamond blade 9. A load applied when the film was exfoliated was determined.

As can be understood from a comparison between the results described above, the capacitance of the solid electrolytic capacitor 1 can be increased and the equivalent series resistance and the leak current can be correspondingly reduced by improving the adhesion strength of the film to the aluminum base. Although the capacitor elements 2 of the solid electrolytic capacitors 1 subjected to the measurement include the cathode foils 5 respectively formed with the aluminum titanium nitride film and the chromium titanium nitride film, a solid electrolytic capacitor having a cathode electrode 5 formed with a zirconium titanium nitride (TiZrN) film supposedly provides substantially the same results.

In the solid electrolytic capacitor 1 having the cathode foil 5 formed with the titanium-containing composite metals nitride film, the adhesion strength of the film to the aluminum base of the cathode foil 5 is improved by forming the film of the nonstoichiometric nitride compound (which cannot be represented by a simple chemical formula) on the cathode foil 5. A part of a metal in the composite metals nitride is oxidized in contact with air thereby to be passivated. Thus, a bonding force between metal molecules in the composite metals nitride is increased. As a result, the corrosion resistance of the film is improved.

The phrase "titanium-containing compound metal nitride" includes aluminum titanium nitride, chromium titanium nitride, and zirconium titanium nitride. Namely, the phrase "titanium-containing compound metal nitride" means nitride of compound which contains two or more kinds of metal.

Therefore, the film is less liable to be exfoliated and cracked when the cathode foil 5 is rolled. Further, the film is less liable to be eroded when the electrically conductive polymer layer is formed. Thus, a greater capacitance and a lower ESR can be achieved without increasing the leak current of the solid electrolytic capacitor 1.

It should be understood that the scope of the invention be not limited by the embodiments described above. For example, the top opening of the case 3 may be sealed with an epoxy resin. Further, the capacitor may have a construction of radial lead type.

INDUSTRIAL APPLICABILITY

1. In the solid electrolytic capacitor 1 having the cathode foil 5 formed with the titanium-containing composite metals nitride film, the adhesion strength of the film to the aluminum base of the cathode foil 5 is improved by forming the film of the nonstoichiometric nitride compound (which cannot be represented by a simple chemical formula) on the cathode foil 5. A part of the metal in the composite metals nitride is oxidized in contact with air thereby to be passivated. Thus, a bonding force between metal molecules in the composite metals nitride is increased. As a result, the corrosion resistance of the film is improved.

Therefore, the film is less liable to be exfoliated and cracked when the cathode foil 5 is rolled. Further, the film is less liable to be eroded when the electrically conductive polymer layer is formed. Thus, a greater capacitance and a lower ESR can be achieved without increasing the leak current of the solid electrolytic capacitor 1.

2. In the case of the solid electrolytic capacitor 1 having the cathode foil 5 formed with the titanium layer and the titanium nitride layer, the change in capacitance over time can be reduced as compared with the solid electrolytic capacitor 1 having the cathode foil 5 formed with only the titanium layer or the titanium nitride layer. The provision of the titanium layer and the titanium nitride layer on the cathode foil 5 increases the initial capacitance of the solid electrolytic capacitor 1 as compared with the prior art solid electrolytic capacitor 1.

What is claimed is:

1. A solid electrolytic capacitor comprising a capacitor element which includes an anode foil and a cathode foil rolled with separator interposed therebetween, and a layer of a solid electrolyte or an electrically conductive polymer provided therein, wherein the cathode foil is coated with a film of a titanium-containing composite metals nitride.

2. A solid electrolytic capacitor as defined in claim 1, wherein the titanium-containing composite metals nitride comprises two kinds of metals of which one is titanium and the other is selected from the group consisting of aluminum, chromium and zirconium.

3. A solid electrolytic capacitor comprising a capacitor element which includes an anode foil and a cathode foil rolled with separator interposed therebetween and a layer of a solid electrolyte or an electrically conductive polymer provided therein, the cathode foil being coated with a thin film of a titanium nitride layer, wherein a titanium layer is formed underlying the titanium nitride layer in the thin film on the cathode foil, and at a boundary zone of the titanium nitride layer and the titanium layer in the thin film on the cathode foil nitrogen of titanium nitride layer diffusing in the titanium layer.

4. A solid electrolytic capacitor comprising a capacitor element which includes an anode foil and a cathode foil rolled with separator interposed therebetween and a layer of a solid electrolyte or an electrically conductive polymer provided therein, the cathode foil being coated with a thin film comprising a titanium nitride layer, wherein a titanium layer is formed underlying the titanium nitride layer in the thin film on the cathode foil, and in the thin film on the cathode foil the titanium layer makes a slow change to the titanium nitride layer, gradually thicker toward the cathode foil by increasing the degree of ratio of nitrogen of the titanium nitride layer from the titanium layer to the titanium nitride layer.

* * * * *